US009776565B2

(12) United States Patent
Lee

(10) Patent No.: US 9,776,565 B2
(45) Date of Patent: Oct. 3, 2017

(54) APPARATUS AND METHOD FOR RECOGNIZING LANE-CHANGING VEHICLE THROUGH RECOGNITION OF ADJACENT LANE

(71) Applicant: MANDO CORPORATION, Pyeongtaek-si (KR)

(72) Inventor: Yun Hee Lee, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 51 days.

(21) Appl. No.: 14/810,329

(22) Filed: Jul. 27, 2015

(65) Prior Publication Data
US 2017/0028915 A1 Feb. 2, 2017

(51) Int. Cl.
G06K 9/00 (2006.01)
B60Q 9/00 (2006.01)
G06K 9/62 (2006.01)

(52) U.S. Cl.
CPC .......... B60Q 9/008 (2013.01); G06K 9/00798 (2013.01); G06K 9/00805 (2013.01); G06K 9/6267 (2013.01)

(58) Field of Classification Search
CPC ............... B60Q 9/008; G06K 9/00798; G06K 9/00805; G06K 9/00825; G06K 9/6267
See application file for complete search history.

(56) References Cited

U.S. PATENT DOCUMENTS

| 2003/0235327 A1 | 12/2003 | Srinivasa | |
|---|---|---|---|
| 2004/0234136 A1* | 11/2004 | Zhu | G06K 9/3241 382/224 |
| 2006/0153459 A1* | 7/2006 | Zhang | G06K 9/3241 382/224 |

(Continued)

FOREIGN PATENT DOCUMENTS

| DE | 102 12 787 | 10/2003 |
|---|---|---|
| DE | 10 2009 007 885 | 8/2010 |

(Continued)

OTHER PUBLICATIONS

Office Action dated Jan. 28, 2016 for German Patent Application No. 10 2015 214 282.5.

Primary Examiner — Amara Abdi
(74) Attorney, Agent, or Firm — Ladas & Parry, LLP

(57) ABSTRACT

Disclosed herein is an apparatus and method for recognizing a lane-changing vehicle through recognition of an adjacent lane, the apparatus including: an image acquisition unit configured to photograph front and surrounding images of an ego-vehicle; a travel lane recognition unit configured to recognize a travel lane of the ego-vehicle; an adjacent lane recognition unit configured to recognize an adjacent lane; a vehicle information database configured to classify and store vehicle data and non-vehicle data; a vehicle recognition unit configured to extract a lane candidate group by recognizing a vertical edge and a horizontal edge, to train vehicle data and non-vehicle data, and then to recognize whether the extracted lane candidate group corresponds to a vehicle or a (Continued)

non-vehicle; and a control unit configured to warn a collision danger when a counterpart vehicle approaches a lane to which the ego-vehicle is to make a change.

10 Claims, 2 Drawing Sheets

(56) References Cited

U.S. PATENT DOCUMENTS

| | | | | |
|---|---|---|---|---|
| 2009/0157247 A1* | 6/2009 | Sjogren | ................ | G08G 1/167 |
| | | | | 701/23 |
| 2014/0226011 A1* | 8/2014 | Park | .................... | G06T 7/60 |
| | | | | 348/148 |
| 2015/0073662 A1* | 3/2015 | Schmudderich | ......... | B62D 6/00 |
| | | | | 701/41 |
| 2015/0112571 A1* | 4/2015 | Schmudderich | ...... | B60W 30/08 |
| | | | | 701/93 |

FOREIGN PATENT DOCUMENTS

| | | | | |
|---|---|---|---|---|
| DE | 102009007885 | * | 8/2010 | ............ B60W 30/08 |
| DE | 10 2010 011 497 | | 9/2011 | |
| KR | 10-2010-00044305 | | 4/2010 | |

\* cited by examiner

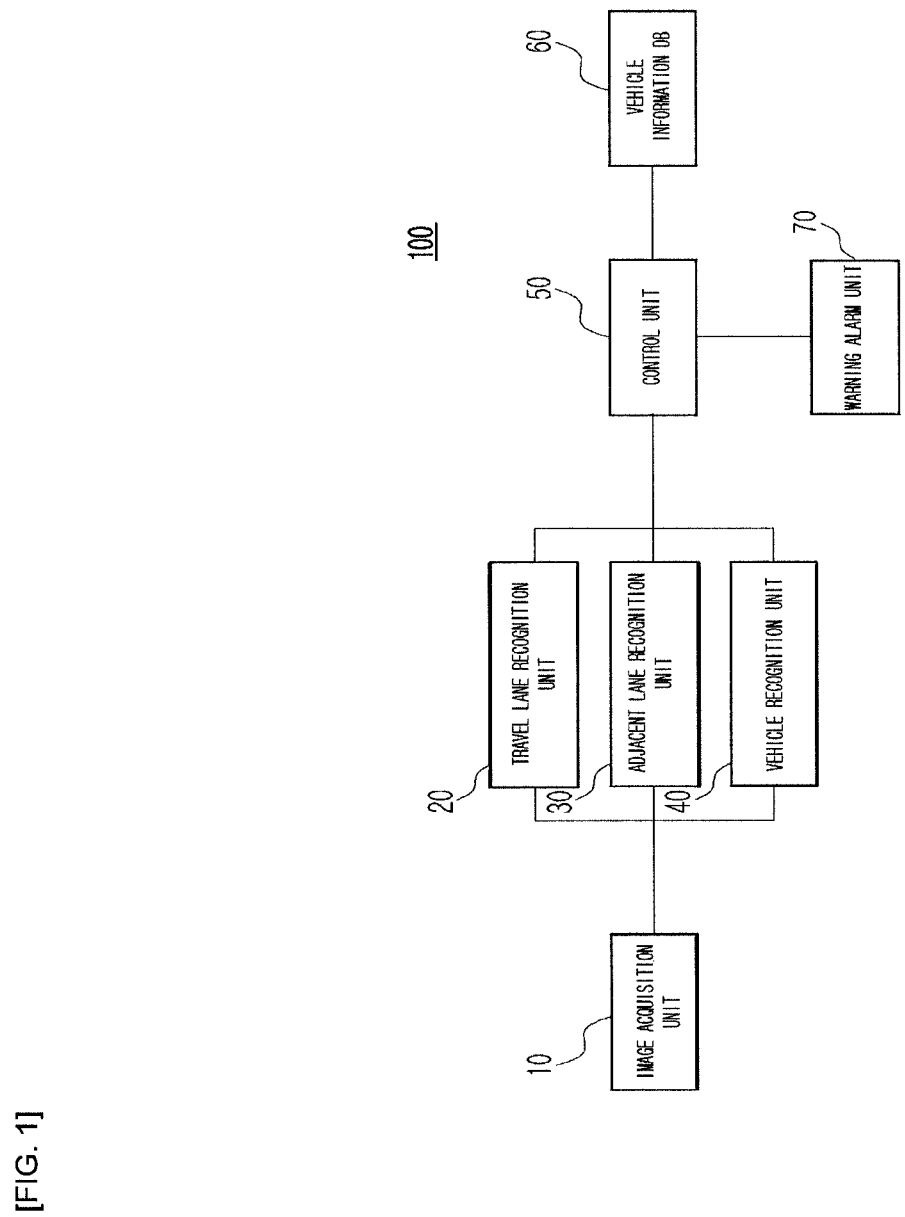
[FIG. 1]

[FIG. 2]
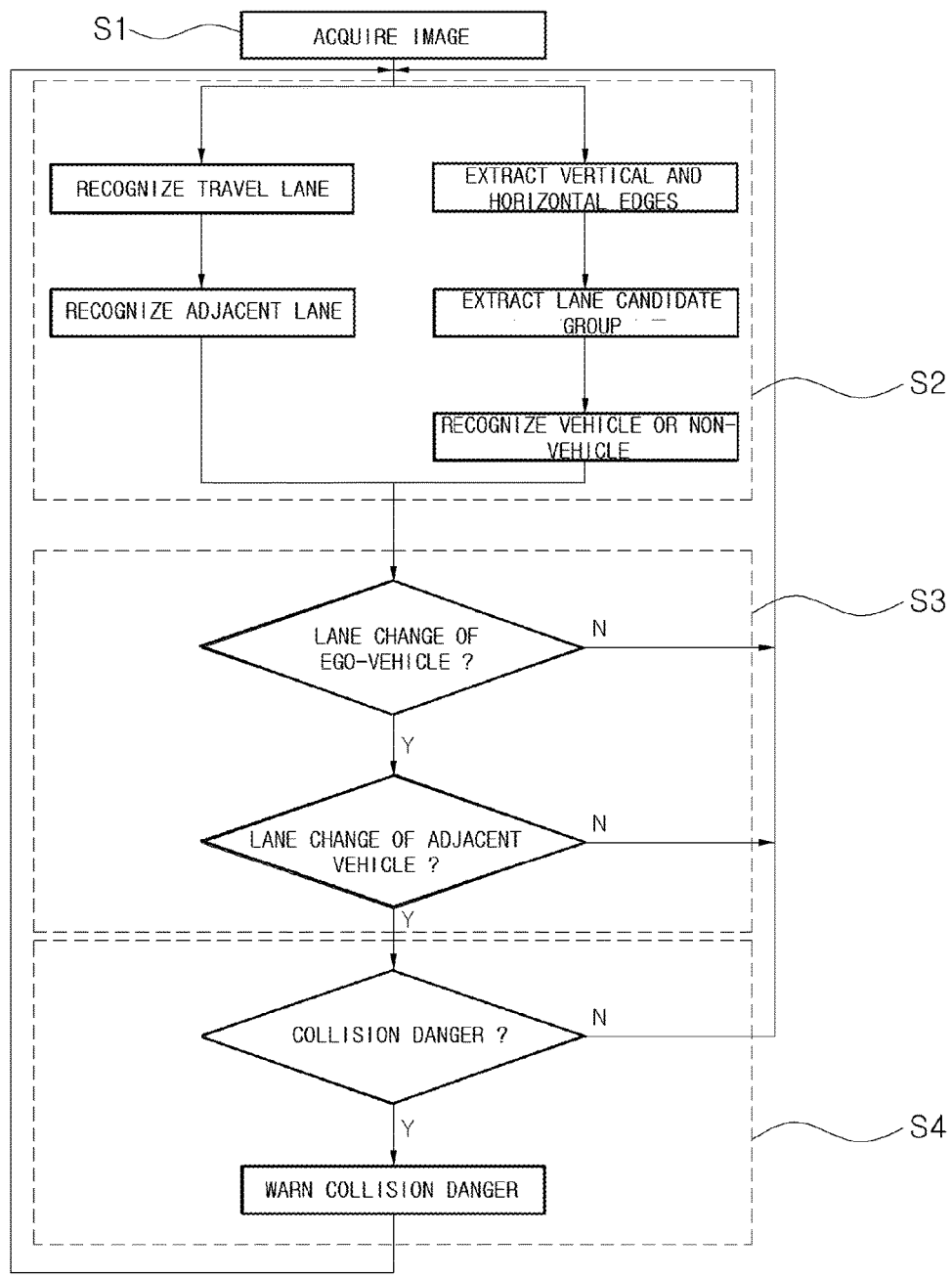

APPARATUS AND METHOD FOR RECOGNIZING LANE-CHANGING VEHICLE THROUGH RECOGNITION OF ADJACENT LANE

BACKGROUND OF THE INVENTION

Field of the Invention

Various embodiments relate to a method for recognizing a lane-changing vehicle through recognition of adjacent lanes, and more particularly, to an apparatus and method for recognizing a lane-changing vehicle through recognition of adjacent lanes, which enables safe driving by sensing a counterpart vehicle cutting in the travel lane of an ego-vehicle from an adjacent lane and giving a warning when the ego-vehicle intends to change the travel lane thereof.

Description of the Related Art

The conventional lane recognition method is performed in such a manner as to recognize lanes by extracting lane marks. When a lane mark is extracted, more accurate lane recognition can be achieved by extracting the lane mark after removing factors, such as ambient noise including shielding a lane by a front vehicle or the like, which cause an error in recognizing a lane.

Various road marks, such as a right turn, a left turn, and a load guidance, exist on a road in addition to lane marks. Since the road marks are marked on a road as the lane marks, and includes the same color information as the lane marks, the road marks may be a factor causing an error in the process of extracting the lane marks.

According to the conventional lane recognition method, since lane marks are extracted without taking such road marks into consideration, an error may occur when extracting a lane mark in a road environment including a road mark, so that it is difficult to accurately recognize a lane.

RELATED ART DOCUMENT

Patent Document (Patent Document 1) Korean Patent Laid-Open Publication No. 10-2010-0044305

SUMMARY OF THE INVENTION

An apparatus and a method for recognizing a lane-changing vehicle through recognition of adjacent lanes, which enables safe driving by sensing a counterpart vehicle cutting in the travel lane of an ego-vehicle from an adjacent lane and giving a warning when the ego-vehicle intends to change the travel lane thereof are described herein.

In an embodiment of the present disclosure, an apparatus for recognizing a lane-changing vehicle through recognition of an adjacent lane includes: an image acquisition unit configured to photograph front and surrounding images of an ego-vehicle which is traveling; a travel lane recognition unit configured to recognize a travel lane of the ego-vehicle from the images photographed by the image acquisition unit; an adjacent lane recognition unit configured to recognize an adjacent lane outside the travel lane from the images photographed by the image acquisition unit; a vehicle information database configured to classify and store vehicle data and non-vehicle data for distinguishing a vehicle from the images photographed by the image acquisition unit; a vehicle recognition unit configured to extract a lane candidate group by recognizing a vertical edge and a horizontal edge from the images photographed by the image acquisition unit, to train vehicle data and non-vehicle data of the vehicle information database, and then to recognize whether the extracted lane candidate group corresponds to a vehicle or a non-vehicle; and a control unit configured to warn a collision danger when a counterpart vehicle recognized by the vehicle recognition unit approaches a lane to which the ego-vehicle is to make a change while the travel lane of the ego-vehicle is being changed.

In addition, the control unit may be configured to warn the counterpart vehicle when it is determined that a collision danger exists between the ego-vehicle and the counterpart vehicle.

In addition, the control unit may be configured to warn the ego-vehicle when it is determined that a collision danger exists between the ego-vehicle and the counterpart vehicle.

In addition, the control unit may be configured to determine that the travel lane is to be changed when a lateral speed with respect to the travel lane increases while an offset between the ego-vehicle and the travel lane enters a predetermined range, or when a turn signal lamp of the ego-vehicle is switched on.

In addition, the control unit may be configured to determine that a lane change is to be made when a lateral speed of the counterpart vehicle traveling on the adjacent lane with respect to the travel lane increases while an offset between the counterpart vehicle and the adjacent lane enters a predetermined range, or when a turn signal lamp of the counterpart vehicle is switched on.

In addition, the control unit may be configured to determine that a collision danger exists and to inform the ego-vehicle so as to stop a lane change or warn the counterpart vehicle so as to stop a lane change when an avoidance distance using braking of the ego-vehicle or an avoidance distance using steering of the ego-vehicle enters a preset range of values according to the avoidance distance.

In addition, the apparatus may further include a warning alarm unit configured to inform the ego-vehicle so as to stop a lane change or to warn the counterpart vehicle so as to stop a lane change.

In an embodiment of the present disclosure, a method for recognizing a lane-changing vehicle through recognition of an adjacent lane by a lane-changing vehicle recognition apparatus, which includes a vehicle information database configured to classify and store vehicle data and non-vehicle data for distinguishing a vehicle from an image, includes: acquiring a front image and a surrounding image of an ego-vehicle which is traveling; recognizing a travel lane of the ego-vehicle and an adjacent lane outside the travel lane from the front image and surrounding image of the ego-vehicle; recognizing a vertical edge and a horizontal edge from the front image and surrounding image of the ego-vehicle, and extracting a lane candidate group; training the vehicle data and the non-vehicle data stored in the vehicle information database, and then recognizing whether the extracted lane candidate group corresponds to a vehicle; determining whether the ego-vehicle is to make a lane change or whether a counterpart vehicle traveling on the adjacent lane is to make a lane change; and warning the counterpart vehicle of a danger when the counterpart vehicle approaches or enters a travel lane to which the ego-vehicle is to make a change and thus when it is determined that a collision danger exists.

In addition, the warning of the counterpart vehicle of a danger may include warning the ego-vehicle when it is determined that a collision danger exists between the ego-vehicle and the counterpart vehicle.

In addition, in the determining of whether a lane change is to be made, the determining of whether a lane change of the ego-vehicle is to be made may include determining that a lane change is be made when a lateral speed with respect to the travel lane increases while an offset between the ego-vehicle and the travel lane enters a predetermined range, or when a turn signal lamp of the ego-vehicle is switched on.

In addition, in the determining of whether a lane change is to be made, the determining of whether a lane change of a counterpart vehicle traveling on the adjacent lane is to be made may include determining that a lane change is be made when a lateral speed with respect to the travel lane increases while an offset between the adjacent lane and the counterpart vehicle traveling on the adjacent lane enters a predetermined range, or when a turn signal lamp of the counterpart vehicle is switched on.

In addition, in the warning of the counterpart vehicle of a danger, the determining of the collision danger may include informing the ego-vehicle so as to stop a lane change or warning the counterpart vehicle so as to stop a lane change when an avoidance distance using braking of the ego-vehicle or an avoidance distance using steering of the ego-vehicle enters a preset range of values according to the avoidance distance.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a block diagram schematically illustrating the configuration of an apparatus for recognizing a lane-changing vehicle through recognition of adjacent lanes according to an embodiment of the present invention; and FIG. 2 is an operational flowchart explaining a method for recognizing a lane-changing vehicle through recognition of adjacent lanes according to an embodiment of the present invention.

DESCRIPTION OF SPECIFIC EMBODIMENTS

Hereinafter, an apparatus and method for recognizing a lane-changing vehicle through recognition of adjacent lanes according to the present disclosure will be described below with reference to the accompanying drawings through exemplary embodiments. The present invention can be realized in various types, and the scope of the present invention is not limited to embodiments disclosed in the specification.

The part of the drawings which are not related to the present invention is skipped from description thereof for better understanding. The same reference numerals are used to designate the same or similar elements throughout the specification.

Unless being otherwise defined, all terms used herein that include technical or scientific terms have the same meaning as those generally understood by those skilled in the art. The terms, such as those defined in dictionaries generally used should be construed to have meaning matching that having in context of the related art and are not construed as ideal or excessively perfunctory meaning unless being clearly defined in this application.

Hereinafter, the embodiments of the present invention will be described in detail with reference to the accompanying drawings so that a person skilled in the art can implement the technical concept disclosed herein. The present invention can be realized in various types, and the scope of the present invention is not limited to embodiments disclosed in the specification.

Hereinafter, a preferred embodiment of the present invention will be described in detail with reference to the accompanying drawings.

FIG. 1 is a diagram illustrating the entire configuration of an apparatus for recognizing a lane-changing vehicle through recognition of adjacent lanes according to an embodiment of the present invention.

Referring to FIG. 1, according to an embodiment of the present invention, an apparatus 100 for recognizing a lane-changing vehicle through recognition of adjacent lanes may include an image acquisition unit 10, a travel lane recognition unit 20, an adjacent lane recognition unit 30, a vehicle recognition unit 40, a control unit 50, a vehicle information database (DB) 60, and a warning alarm unit 70.

The image acquisition unit 10 may acquire a front image and a surrounding image by photographing a front view and a surrounding view of his/her own vehicle (i.e. ego-vehicle) which is traveling. To this end, a camera for a vehicle separately mounted on the vehicle, a camera of a black box, a pre-mounted camera for the vehicle, or the like may be utilized.

The travel lane recognition unit 20 may be electrically coupled to the image acquisition unit 10, and may recognize the travel lane of the ego-vehicle from an image acquired through the image acquisition unit 10.

The adjacent lane recognition unit 30 may be electrically coupled to the image acquisition unit 10, and may acquire an adjacent lane outside the travel lane from an image acquired through the image acquisition unit 10.

The vehicle recognition unit 40 may be electrically coupled to the image acquisition unit 10, and may be configured to recognize a vertical edge and a horizontal edge from an image acquired through the image acquisition unit 10, to extract a lane candidate group, to train vehicle data and non-vehicle data in the vehicle information database 60, and to recognize whether the extracted lane candidate group corresponds to a vehicle or a non-vehicle.

The control unit 50 may determine a collision danger and give a warning according to whether or not a counterpart vehicle (i.e. a preceding vehicle) recognized by the vehicle recognition unit 40 is approaching a lane to which the ego-vehicle is to make a lane change when a travel lane of the ego-vehicle recognized by the travel lane recognition unit 20 is changed.

In addition, the present invention enables an active response to a pedestrian crossing a road or to an unexpected situation, such as a falling rock or a wild animal suddenly running into a road, as well as to the case where the ego-vehicle or a counterpart vehicle makes a lane change.

Here, when determining that there is a collision danger between the ego-vehicle and a counterpart vehicle, the control unit 50 may give a warning to the counterpart vehicle. In addition, when determining that there is a collision danger between the ego-vehicle and a counterpart vehicle, the control unit 50 may give a warning to the ego-vehicle. A method for giving a warning may include various applications and changes, such as flickering the headlights of the ego-vehicle, automatically sounding a horn, warning a counterpart vehicle with sound, or warning through communication between a navigation device of the ego-vehicle and a navigation device of a counterpart vehicle.

In addition, when the lateral speed of the ego-vehicle with respect to a travel lane thereof increases while an offset between the ego-vehicle and the travel lane enters a predetermined range, or when a turn signal lamp of the ego-vehicle is switched on, the control unit 50 may determine that a lane change is to be made.

In addition, on the basis of an avoidance distance using the braking of the ego-vehicle or an avoidance distance using the steering of the ego-vehicle, when the avoidance distance enters a preset range of values, the control unit 50 may determine that there is a collision danger and give the ego-vehicle an alarm so as not to make a lane change.

Here, the avoidance distance $d_{brk\_avoid}$ using the braking of the ego-vehicle may be set according to equation 1.

$$d_{brk\_avoid} = -\frac{v^2}{2a_x} + vt_{delay} \qquad (1)$$

Here, "v" represents a vehicle speed, "a" represents an available deceleration, and "t" represents a delay time.

In addition, the avoidance distance $d_{steer\_avoid}$ using the steering of the ego-vehicle may be set according to equation 2.

$$d_{steer\_avoid} = \sqrt{\frac{2w}{a_y}} \, v + vt_{delay} \qquad (2)$$

Here, "w" represents the width of an obstacle.

In addition, on the basis of an avoidance distance using the braking of the ego-vehicle or an avoidance distance using the steering of the ego-vehicle, when the avoidance distance enters a preset range of values, the control unit 50 may determine that there is a collision danger and give a counterpart vehicle an alarm so as not to make a lane change.

FIG. 2 is an operational flowchart explaining a method for recognizing a lane-changing vehicle through recognition of adjacent lanes.

In the following description of the present invention, when an adjacent vehicle which is running on an adjacent lane of a travel lane, on which an ego-vehicle is running, and is to make a lane change and to enter the travel lane of the ego-vehicle, the adjacent vehicle to enter the travel lane will be called a counterpart vehicle (a preceding vehicle).

Referring to FIG. 2, in the lane-changing vehicle recognition apparatus 100 through recognition of adjacent lanes according to an embodiment of the present invention, first, the image acquisition unit 10 acquires a front image and a surrounding image with respect to the traveling ego-vehicle by photographing a front view and a surrounding view through a camera in step S1.

Subsequently, the lane-changing vehicle recognition apparatus 100 performs an operation of recognizing a travel lane, an adjacent lane, and a vehicle from the front image and surrounding image of the ego-vehicle in step S2.

That is to say, the lane-changing vehicle recognition apparatus 100 recognizes the travel lane of the ego-vehicle from the front image and surrounding image of the ego-vehicle through the travel lane recognition unit 20, and recognizes an adjacent lane from the front image and surrounding image of the ego-vehicle through the adjacent lane recognition unit 30.

In addition, the lane-changing vehicle recognition apparatus 100 recognizes whether an object is a counterpart vehicle traveling on an adjacent lane or a non-vehicle through the vehicle recognition unit 40.

In more detail, the method is subjected to the processes of recognizing the travel lane of the ego-vehicle from the front image and surrounding image of the ego-vehicle, and then recognizing an adjacent lane outside the travel lane.

Subsequently, a process of recognizing whether an object existing on the adjacent lane outside the travel lane from the front image and surrounding image of the ego-vehicle is a vehicle or a non-vehicle is additionally performed.

In this case, the process of recognizing whether an object recognized to exist on the adjacent lane is a vehicle or a non-vehicle may be performed in such a manner as to recognize a vertical edge and a horizontal edge from the front image and surrounding image of the ego-vehicle, to extract a lane candidate group, and then to determine whether the object is a vehicle or a non-vehicle by training through the lane candidate group.

For example, an outline is extracted according to a horizontal edge in Table 1 and a vertical edge in Table 2 using a 3 by 3 Sobel mask, a lane candidate group is extracted using the extracted vertical and horizontal edges, vehicle data and non-vehicle data stored in the vehicle information database 60 are trained with respect to the lane candidate group through a support vector machine (SVM), and then a vehicle or a non-vehicle is distinguished. Here, deciding a boundary line using a Sobel mask or an SVM is a widely known technique, so a detailed description thereof will be omitted.

TABLE 1

| -1 | -2 | -1 |
|----|----|----|
| 0  | 0  | 0  |
| 1  | 2  | 1  |

TABLE 2

| -1 | 0 | 1 |
|----|---|---|
| -2 | 0 | 2 |
| -1 | 0 | 1 |

Subsequently, the lane-changing vehicle recognition apparatus 100 determines whether or not the ego-vehicle attempts a lane change, or whether or not a counterpart vehicle traveling on an adjacent lane attempts a lane change on the basis of the recognized information in step S3.

In this case, in determining whether or not the ego-vehicle attempts a lane change, when the lateral speed of the ego-vehicle with respect to a travel lane thereof increases while an offset with the travel lane enters a predetermined range, or when a turn signal lamp of the ego-vehicle is switched on, it is determined that the ego-vehicle attempts a lane change.

In addition, in determining whether or not a counterpart vehicle traveling on an adjacent lane attempts a lane change, when the lateral speed of the counterpart vehicle with respect to a travel lane increases while an offset with an adjacent lane enters a predetermined range, or when a turn signal lamp of the counterpart vehicle is switched on, it is determined that the counterpart vehicle attempts a lane change.

Subsequently, when it is determined on the basis of lane change information of the ego-vehicle and lane change information of the counterpart vehicle that the counterpart vehicle approaches or enters a travel lane to which the ego-vehicle is to make a lane change and thus there is a collision danger, the lane-changing vehicle recognition apparatus 100 warns the counterpart vehicle of a danger in step S4.

In addition, when it is determined that there is a collision danger between the ego-vehicle and the counterpart vehicle, the lane-changing vehicle recognition apparatus 100 may output an alarm to warn the ego-vehicle.

In this case, in determining a collision danger, when an avoidance distance enters a preset range of values on the basis of an avoidance distance using the braking of the ego-vehicle or an avoidance distance using the steering of the ego-vehicle, the lane-changing vehicle recognition apparatus 100 may determine that there is a collision danger between the ego-vehicle and the counterpart vehicle, and may notify the ego-vehicle not to make a lane change or warn the counterpart vehicle not to make a lane change. The avoidance distance $d_{brk\_avoid}$ using the braking of the ego-vehicle may be calculated by equation 1, and the avoidance distance $d_{steer\_avoid}$ using the steering of the ego-vehicle may be calculated by equation 2.

A method for giving a warning may include various applications and changes, such as flickering the headlights of the ego-vehicle, automatically sounding a horn, warning a counterpart vehicle with sound, or warning through communication between a navigation device of the ego-vehicle and a navigation device of a counterpart vehicle.

According to the present invention as described above, an apparatus and method for recognizing a lane-changing vehicle through recognition of adjacent lanes which enables safe driving can be implemented by sensing a counterpart vehicle cutting in the travel lane of an ego-vehicle from an adjacent lane and giving a warning when the ego-vehicle intends to change the travel lane thereof.

According to the present invention, as a counterpart vehicle traveling on an adjacent lane approaches the travel lane of an ego-vehicle or attempts a lane change, it is determined whether or not there is a collision danger, and a warning is given to the counterpart vehicle, so that safe driving can be achieved.

In addition, the present invention provides an excellent effect in preventing a collision with a counterpart vehicle in the case where a counterpart vehicle makes a lane change and cuts in a specific lane when the ego-vehicle is to make a lane change to the specific lane.

In addition, the present invention enables an active response to a pedestrian crossing a road or to an unexpected situation, such as a falling rock or a wild animal suddenly running into a road, as well as to the case where the ego-vehicle and/or a counterpart vehicle makes a lane change.

Since those skilled in the art to which the present invention belongs may understand that the present invention may be carried out in other specific forms without changing the technical concepts or essential features thereof, it should be understood that the examples stated above are illustrative in every way, not limitative.

The scope of the present invention is defined by the following claims, and all modified or varied forms derived from the meaning and scope of the claims and also equivalent concepts thereof should be interpreted to be included in the scope of the present invention.

What is claimed is:

1. An apparatus for recognizing a lane-changing vehicle through recognition of an adjacent lane, the apparatus comprising:
    an image acquisition unit photographing front and surrounding images of an ego-vehicle which is traveling;
    a travel lane recognition unit recognizing a travel lane of the ego-vehicle from the images photographed by the image acquisition unit;
    an adjacent lane recognition unit recognizing an adjacent lane outside the travel lane from the images photographed by the image acquisition unit;
    a vehicle information database configured to classify and store vehicle data and non-vehicle data for distinguishing a vehicle from the images photographed by the image acquisition unit;
    a vehicle recognition unit extracting a lane candidate group by recognizing a vertical edge and a horizontal edge from the images photographed by the image acquisition unit, to train vehicle data and non-vehicle data of the vehicle information database, and then to recognize whether the extracted lane candidate group corresponds to a vehicle or a non-vehicle; and
    a control unit warning a collision danger when a counterpart vehicle recognized by the vehicle recognition unit approaches a lane to which the ego-vehicle is to make a change while the travel lane of the ego-vehicle is being changed,
    wherein the control unit determines that a collision danger exists and to inform the ego-vehicle so as to stop a lane change or warn the counterpart vehicle so as to stop a lane change when an avoidance distance using braking of the ego-vehicle or an avoidance distance using steering of the ego-vehicle enters a preset range of values according to the avoidance distance.

2. The apparatus according to claim 1, wherein the control unit warns the counterpart vehicle when it is determined that a collision danger exists between the ego-vehicle and the counterpart vehicle.

3. The apparatus according to claim 2, wherein the control unit warns the ego-vehicle when it is determined that a collision danger exists between the ego-vehicle and the counterpart vehicle.

4. The apparatus according to claim 1, wherein the control unit determines that the travel lane is to be changed when a lateral speed with respect to the travel lane increases while an offset between the ego-vehicle and the travel lane enters a predetermined range, or when a turn signal lamp of the ego-vehicle is switched on.

5. The apparatus according to claim 1, wherein the control unit determines that a lane change is to be made when a lateral speed of the counterpart vehicle traveling on the adjacent lane with respect to the travel lane increases while an offset between the counterpart vehicle and the adjacent lane enters a predetermined range, or when a turn signal lamp of the counterpart vehicle is switched on.

6. The apparatus according to claim 1, further comprising a warning alarm unit informing the ego-vehicle so as to stop a lane change or to warn the counterpart vehicle so as to stop a lane change.

7. A method for recognizing a lane-changing vehicle through recognition of an adjacent lane by a lane-changing vehicle recognition apparatus, which comprises a vehicle information database configured to classify and store vehicle data and non-vehicle data for distinguishing a vehicle from an image, the method comprising:
    acquiring a front image and a surrounding image of an ego-vehicle which is traveling;
    recognizing a travel lane of the ego-vehicle and an adjacent lane outside the travel lane from the front image and surrounding image of the ego-vehicle;
    recognizing a vertical edge and a horizontal edge from the front image and surrounding image of the ego-vehicle, and extracting a lane candidate group;

training the vehicle data and the non-vehicle data stored in the vehicle information database, and then recognizing whether the extracted lane candidate group corresponds to a vehicle;

determining whether the ego-vehicle is to make a lane change or whether a counterpart vehicle traveling on the adjacent lane is to make a lane change; and warning the counterpart vehicle of a danger when the counterpart vehicle approaches or enters a travel lane to which the ego-vehicle is to make a change and thus when it is determined that a collision danger exists, wherein, in the warning of the counterpart vehicle of a danger, the determining of the collision danger comprises informing the ego-vehicle so as to stop a lane change or warning the counterpart vehicle so as to stop a lane change when an avoidance distance using braking of the ego-vehicle or an avoidance distance using steering of the ego-vehicle enters a preset range of values according to the avoidance distance.

8. The method according to claim 7, wherein the warning of the counterpart vehicle of a danger comprises warning the ego-vehicle when it is determined that a collision danger exists between the ego-vehicle and the counterpart vehicle.

9. The method according to claim 7, wherein, in the determining of whether a lane change is to be made, the determining of whether a lane change of the ego-vehicle is to be made comprises determining that a lane change is be made when a lateral speed with respect to the travel lane increases while an offset between the ego-vehicle and the travel lane enters a predetermined range, or when a turn signal lamp of the ego-vehicle is switched on.

10. The method according to claim 7, wherein, in the determining of whether a lane change is to be made, the determining of whether a lane change of a counterpart vehicle traveling on the adjacent lane is to be made comprises determining that a lane change is be made when a lateral speed with respect to the travel lane increases while an offset between the adjacent lane and the counterpart vehicle traveling on the adjacent lane enters a predetermined range, or when a turn signal lamp of the counterpart vehicle is switched on.

* * * * *